United States Patent
Naimpally et al.

[19]

[11] Patent Number: 5,818,539
[45] Date of Patent: Oct. 6, 1998

[54] SYSTEM AND METHOD FOR UPDATING A SYSTEM TIME CONSTANT (STC) COUNTER FOLLOWING A DISCONTINUITY IN AN MPEG-2 TRANSPORT DATA STREAM

[75] Inventors: Saiprasad V. Naimpally, Langhorne, Pa.; Joseph P. O'Hara, Medford, N.J.; Edwin Robert Meyer, Bensalem; Robert T. Ryan, Langhorne, both of Pa.

[73] Assignee: Matsushita Electric Corporation of America, Secaucus, N.J.

[21] Appl. No.: 626,184

[22] Filed: Mar. 29, 1996

[51] Int. Cl.[6] .................................................. H04L 7/00
[52] U.S. Cl. ..................... 348/512; 348/465; 348/845.3; 370/392; 370/473
[58] Field of Search ..................................... 370/392, 394, 370/473, 474, 471, 395, 509; 348/426, 469, 461, 495, 720, 725, 423, 462, 464, 465, 467, 512, 515, 845.3

[56] References Cited

U.S. PATENT DOCUMENTS

| | | | |
|---|---|---|---|
| 5,517,250 | 5/1996 | Hoogenboom et al. | 348/423 |
| 5,588,029 | 12/1996 | Maturi et al. | 375/364 |
| 5,650,825 | 7/1997 | Naimpally et al. | 348/465 |
| 5,675,654 | 10/1997 | Ryan | 380/48 |
| 5,699,392 | 12/1997 | Dokic | 375/376 |
| 5,703,877 | 12/1997 | Nuber et al. | 370/395 |

OTHER PUBLICATIONS

Zoran Corporation, "Six Channel Dolby Digital Surround Processor", ZR38500, Nov. 1994, pp. 1–28.
C–Cube Microsystems, "CL9100 Multimode Video Decoder User's Manual", Preliminary Release, Oct. 19, 1994.

*Primary Examiner*—Wellington Chin
*Assistant Examiner*—Soon-Dong Hyun
*Attorney, Agent, or Firm*—Ratner & Prestia

[57] ABSTRACT

A transport decoder 110, for receiving and processing a transport data stream using MPEG-2 formats, includes connections to a physical layer channel interface (channel interface) 112, a buffer memory 114, a host microprocessor 116, audio and video decoders 118/120, and clock signal circuitry 122. Upon receipt of a discontinuity indicator, the transport packet headers are parsed and transport packet payloads are stored in memory. Subsequently, upon receipt of a next program counter reference (PCR) value, a counter is loaded with the received program counter reference value. Next, the data stored in memory is searched for a time stamp and, when one is found, the time stamp is retrieved. Finally, a timer interrupt is set for a point in time approximately one frame time before the time stamp value, and, when the timer interrupt occurs, the program counter reference value is sent to the decoders, thereby providing sufficient time for the decoders to process data.

7 Claims, 8 Drawing Sheets

SYSTEM AND METHOD FOR UPDATING A SYSTEM TIME CONSTANT (STC) COUNTER FOLLOWING A DISCONTINUITY IN AN MPEG-2 TRANSPORT DATA STREAM

FIELD OF THE INVENTION

The present invention relates generally to data reception, processing and transmission of data encoded according to MPEG-2 standards and, more particularly, the present invention relates to the operation and interfacing of a transport decoder which handles an MPEG-2 format datastream.

BACKGROUND OF THE INVENTION

High Definition Television (HDTV) continues to make progress in its attempts to replace conventional television. Paving the way for this progress are various companies and associations working on standards to provide for a global market for HDTV.

One such group of companies is known as the "Digital HDTV Grand Alliance" including members such as AT&T, David Sarnoff Research Center, Massachusetts Institute of Technology and others. A comprehensive overview of the strides made by this group are presented in an article by Robert Hopkins entitled "Digital Terrestrial HDTV for North America: The Grand Alliance HDTV System" published in the IEEE Transactions on Consumer Electronics (Summer 1994). This article is herein incorporated by reference for all of its teachings regarding the background and basics of HDTV systems including the use of Program and Transport Packet Streams.

One standard that has been adopted by the Grand Alliance is the MPEG-2 standard for encoding video and audio information, developed by the Moving Pictures Expert Group (MPEG), a committee within the International Standards Organization (ISO). Accepted standards are periodically published such as, for example, the Video Section of Information Technology—Generic Coding of Moving Pictures and Associated Audio ISO/IEC 13818-2 (1995) (hereinafter "Video Section") and the Systems Section of Information Technology—Generic Coding of Moving Pictures and Associated Audio ISO/IEC 13818-1 (November 1994) (hereinafter "Systems Section") both of which are incorporated herein by reference for their teachings regarding established standards and formats.

The syntax for the MPEG-2 standard defines several layers of data records which are used to convey both audio and video data. To transmit information, a digital data stream, representing, for example, multiple video sequences, is divided into several smaller units and each of these units is encapsulated into a respective packetized elementary stream (PES) packet. For transmission, each PES packet is divided, in turn, among a plurality of fixed-length transport packets. Each transport packet contains data relating to only one PES packet. The transport packet also includes a header which holds control information, sometimes including an adaptation field, to be used in decoding the transport packet. However, PES data may include multiple elementary streams.

As set forth in the Systems Section, synchronization among multiple elementary streams is accomplished by periodically providing time stamps in the data stream. For instance, the decoding of N elementary streams is synchronized by adjusting the decoding of the streams to a common master time base rather than by adjusting the decoding of one stream to match that of another. The master time base may be the clock signal of one of the N decoders, or the clock signal of the data source, or it may be an externally supplied clock signal.

To aid in this synchronization process, included in the transport header of the MPEG-2 standard is a "discontinuity indicator". A syntax representation is provided in the Systems Section showing where in the transport header an exemplary "discontinuity indicator" resides. This syntax is re-presented below in Table I.

TABLE I

Transport Stream adaptation field

| Syntax | No. of Bits | Mnemonic |
|---|---|---|
| adaptation_field() { | | |
|     adaptation_field length | 8 | imsbf |
|     if(adaptation_field_length > 0) { | | |
|         discontinuity_indicator | 1 | bslbf |
|         random_access_indicator | 1 | bslbf |
|         elementary_stream_priority_indicator | 1 | bslbf |
|         PCR_flag | 1 | bslbf |
|         OPCR_flag | 1 | bslbf |
|         splicing_point_flag | 1 | bslbf |
|         transport_private_data_flag | 1 | bslbf |
|         adaptation_field_extension_flag | 1 | bslbf |
|         if(PCR_flag == '1') { | | |
|             program_clock_reference_base | 33 | uimsbf |
|             reserved | 6 | bslbf |
|             program_clock_reference_extension | 9 | uimsbf |
|         } | | |
|         if(OPCR_flag == '1') { | | |
|             original_program_clock_reference_base | 33 | uimsbf |
|             reserved | 6 | bslbf |
|             original_program_clock_reference_extension | 9 | uimsbf |
|         } | | |
|         if(splicing_point_flag == '1') { | | |
|             splice_countdown | 8 | tcimsbf |
|         } | | |
|         if(transport_private data_flag == '1') { | | |

TABLE I-continued

Transport Stream adaptation field

| Syntax | No. of Bits | Mnemonic |
|---|---|---|
|       transport_private_data_length | 8 | uimsbf |
|       for (i=0; i<transport_private_data_length;i++) { | | |
|           private_data_byte | 8 | bslbf |
|       } | | |
|     } | | |
|     if(adaptation_field_extension_flag == '1'){ | | |
|       adaptation_field_extension_length | 8 | uimsbf |
|       ltw_flag | 1 | bslbf |
|       piecewise_rate_flag | 1 | bslbf |
|       seamless_splice_flag | 1 | bslbf |
|       reserved | 5 | bslbf |
|       if(ltw_flag == '1'){ | | |
|           ltw_valid_flag | 1 | bslbf |
|           ltw_offset | 15 | uimsbf |
|       } | | |
|       if(piecewise_rate_flag == '1'){ | | |
|           reserved | 2 | bslbf |
|           piecewise_rate | 22 | uimsbf |
|       } | | |
|       if(seamless_splice_flag == '1') { | | |
|           splice_type | 4 | bslbf |
|           DTS_next_au[32 . . . 30] | 3 | bslbf |
|           marker_bit | 1 | bslbf |
|           DTS_next_au[29 . . . 15] | 15 | bslbf |
|           marker_bit | 1 | bslbf |
|           DTS_next_au[14 . . . 0] | 15 | bslbf |
|           marker_bit | 1 | bslbf |
|       } | | |
|       for(i=0;i<N;i++){ | | |
|           reserved | 8 | bslbf |
|       } | | |
|     } | | |
|     for (i=0);i<N;i++){ | | |
|       stuffing_byte | 8 | bslbf |
|     } | | |
|   } | | |
| } | | |

As described in the Systems Section, the discontinuity indicator resides within an adaptation field within the Transport Header. The discontinuity indicator is a 1 bit field which, when set to a logical '1', indicates that the discontinuity state is true for the current Transport Stream packet. When the discontinuity indicator is set to a logical '0' or is not present, the discontinuity state is false. The discontinuity indicator is used to indicate two types of discontinuities, system time-base discontinuities and continuity counter discontinuities.

A system time-base discontinuity is indicated by the use of the discontinuity indicator in Transport Stream program identification (PID) packets designated as a Program Clock Reference (PCR) PID (refer to Systems Section 2.4.4.9 on page 50). Subsequently, a PCR value (i.e., reference to a master clock signal) is received.

The discontinuity indicator bit is set, for example, when program material which was recorded with one time base is inserted into a data stream that was recorded with another time base. The difference in time base appears as an unexpected PCR value.

When the discontinuity state is true for a Transport Stream packet of a PID designated as a PCR PID, the next PCR in a Transport Stream packet with that same PID represents a sample of a new system time clock for the associated program. The system time-base discontinuity point is defined to be the instant in time when the first byte of a packet containing a PCR of a new system time-base arrives at the input of the System Target Decoder (STD).

It should be noted that an STD is well known in the art and, briefly, represents a hypothetical decoder which is conceptually connected to an output of a transport encoder. It is required that a datastream that conforms to the MPEG-2 standard shall not cause dataflow problems for the STD (including buffer overflow). Additional discussion of the STD is provided in the Systems Section.

Continuing, the discontinuity indicator bit may also be set to '1' in Transport Stream packets of the same PCR PID prior to the packet which contains the new system time-base PCR. In this case, once the discontinuity indicator has been set to '1', it continues to be set to '1' in all Transport Stream packets of the same PCR PID up to and including the Transport Stream packet which contains the first PCR of the new system time-base. After the occurrence of a system time-base discontinuity, no fewer than two PCRs for the new system time-base will be received before another system time-base discontinuity can occur. Further, except when a trick mode status is true, data from no more than two system time-bases shall be present in the STD buffers for one program at any time.

A potential problem occurs when a time-base discontinuity requires that multiple System Time Constant (STC) values (e.g., in a Clock Manager of a Transport Decoder and in external video and audio decoders) be updated, particularly when a substantial latency may exist between data that is presently being decoded by external decoders and data that is being received and stored in the buffers of a transport decoder. That is, typically a transport decoder is coupled to external video and audio decoders each of which maintain an STC or equivalent thereof. Thus, when a change in system time-base occurs, adjusting all of the STC's at the same time may create system synchronization problems.

With this in mind, an important concern, addressed by the present invention, is how a transport decoder can efficiently handle the occurrence of a system time-base discontinuity between buffers and decoders.

SUMMARY OF THE INVENTION

The present invention involves a system designed for receiving a transport data stream which includes transport packets having headers and payloads, the headers include a discontinuity indicator. The system including at least one buffer for temporarily storing the received transport data stream and at least one external decoder for decoding data output from the buffer for presentation purposes. The present invention is designed to handle the receipt of a discontinuity indicator by, upon receiving a discontinuity indicator, parsing the transport packet header and storing the transport packet payloads in memory. Upon receiving a next program counter reference value, a counter is loaded with the received program counter reference value. The data stored is then searched for a time stamp and, when one is found, the time stamp is retrieved. Finally, a timer interrupt is set for a point in time based on the retrieved time stamp, and, when the timer interrupt occurs, the program counter reference value is sent to the decoder, providing the new time stamp value insufficient time for the decoder to process data having the new time base without interfering with the processing of data having the previous time base.

BRIEF DESCRIPTION OF THE DRAWINGS

The invention is best understood from the following detailed description when read in connection with the accompanying drawing, in which.

DETAILED DESCRIPTION OF THE INVENTION

Overview

As mentioned above, one important aspect of the present invention is how a transport decoder can efficiently handle a discontinuity indicator. Another aspect of the present invention is interfacing a transport decoder to a video decoder which can only handle elementary stream data. Still another aspect of the present invention involves interfacing a transport decoder to a bit rate-constrained audio decoder. To encompass the above listed aspects, the present invention includes a specially-designed MPEG-2 Transport Decoder.

To provide some context for the discontinuity aspect of the present invention, a real-world example of a time-base discontinuity would occur if a program were being broadcast, using MPEG-2 formats, via satellite to many receiving stations across the country. But, during the program, each station inserted its own respective commercials. In this situation, a discontinuity indicator would be set to indicate a gap or break in the time-base of the program in order to allow for the insertion of commercials, each having its own local time base. The program transmission from the satellite, however, would continue while the individual stations inserted their respective programs. Accordingly, the internal timing of the transport decoder for receiving the program broadcast from the local station with the inserted commercials would desirably track the appropriate time-bases when a discontinuity indicator is encountered.

Figure 1A:
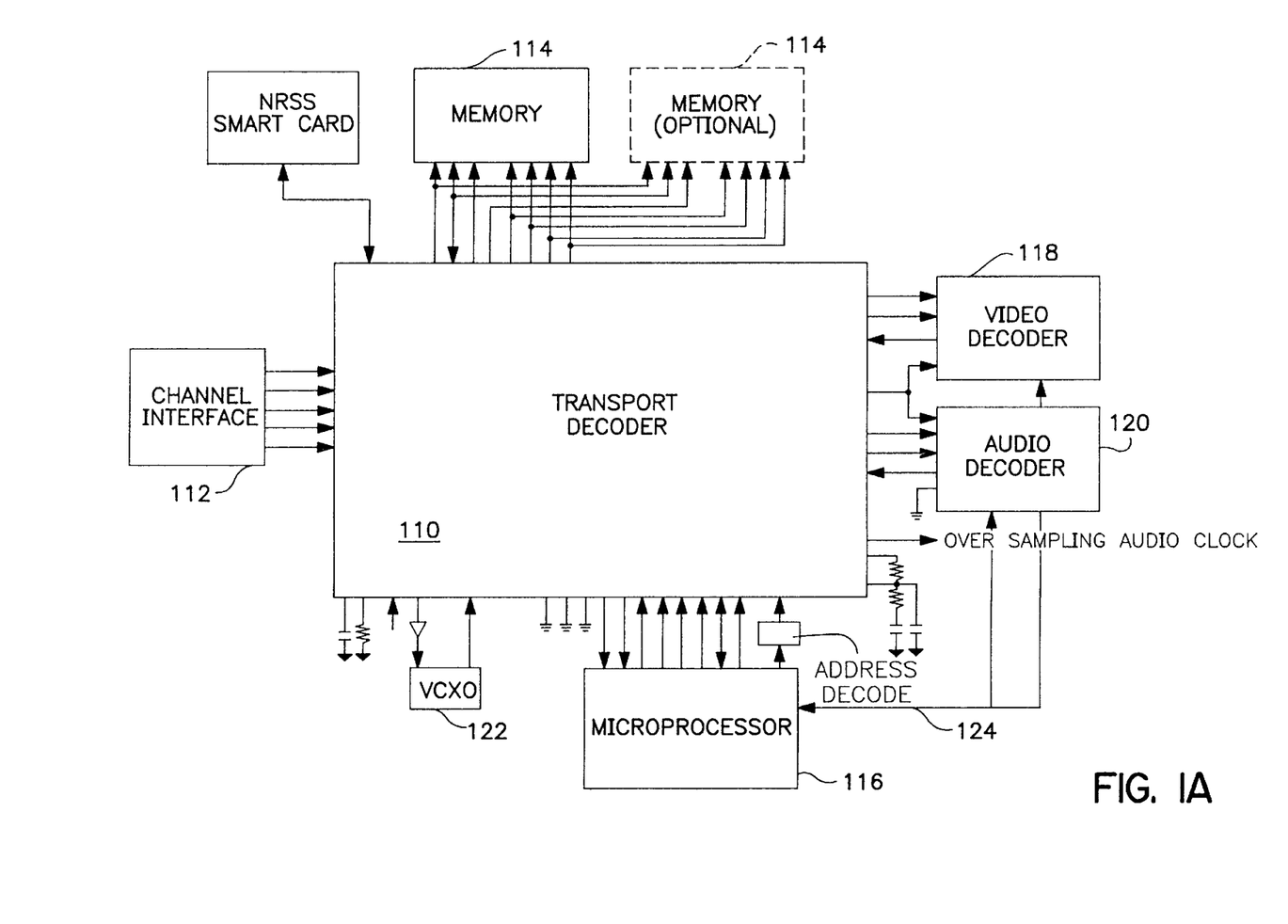
FIG. 1A shows a high-level functional block diagram of an exemplary digital transport decoder and its various interfaces.

Turning to the figures, FIG. 1A shows a high-level functional block diagram of an exemplary digital transport decoder 110 and its various interfaces. As shown in FIG. 1A, transport decoder 110 includes connections to a physical layer channel interface (channel interface) 112, buffer memory 114, a host microprocessor 116, external video and audio decoders 118 and 120, and clock signal circuitry (e.g., VCXO) 122. In the exemplary embodiment of the present invention, the transport decoder 110 supports one video interface and up to two audio interfaces (e.g., audio A and audio B).

Host microprocessor 116 is also coupled, external to transport decoder 110, to the video and audio decoders 118 and 120 by way of microbus 124. This connection may use parallel or serial data paths and depends on the requirements of the individual external decoders selected for use. In any event, as will be appreciated by those of ordinary skill in the art, this method of coupling the host microprocessor 116 to external decoders is well known.

Generally, the transport decoder 110 and each of the external video and audio decoders 118 and 120 include a System Time Constant (STC) value (not shown) maintained in a register or counter for the purpose of synchronizing the decoding and display of the received data stream.

As mentioned, a problem can occur when a time-base discontinuity occurs within the data stream, and the discontinuity requires STC values to be updated both in the transport decoder 110 and in the video and audio decoders 118 and 120. This is particularly a problem when a substantial latency may exist between data presently being decoded by the external decoders and data being received and stored in the transport processor 110.

In the present invention, microprocessor 116 has an important function in controlling the synchronization of the datastream and the operation of the video and audio decoders 118 and 120. In the present invention, microprocessor 116 has direct, memory-mapped access to various on-chip registers within the transport decoder 110. Microprocessor 116 also has access to buffer areas in the external memory 114 (through read, write and watermark pointers) and to on-chip 32-byte Read and Write FIFOs (shown in FIG. 3). Microprocessor 116 is coupled to several internal functional blocks by an internal microbus 223 (shown in FIG. 2B) and allows for various event and error conditions to be signaled via maskable interrupts.

Figure 1B:
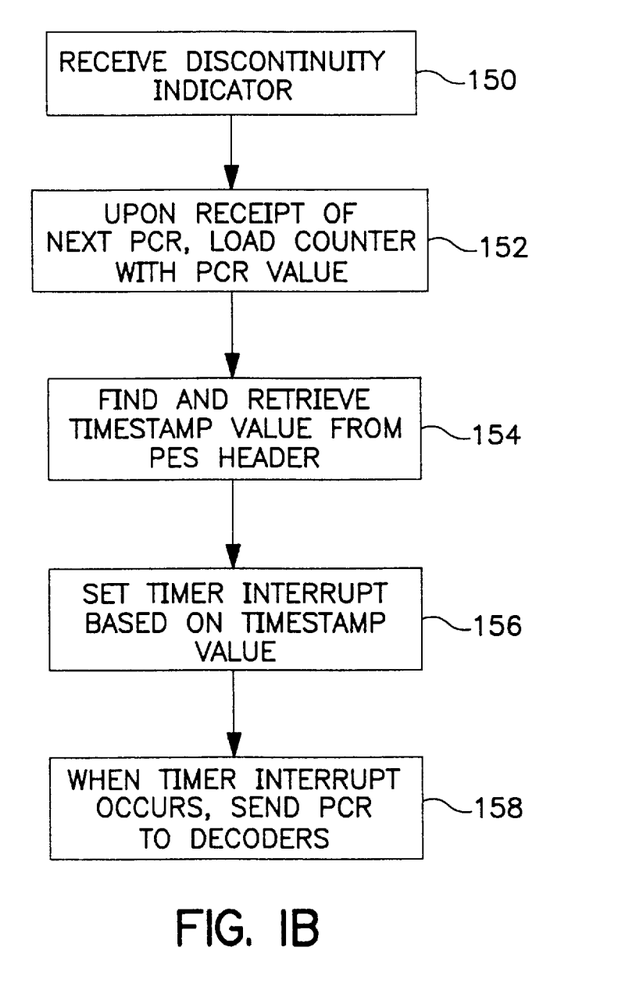
FIG. 1B shows a high-level flowchart illustrating the steps followed by one aspect of the present invention using the exemplary implementation shown in FIG. 1A.

Generally, as illustrated in the flowchart of FIG. 1B, one aspect of the present invention, by way of the specially-designed transport decoder 110, performs the following steps after receiving of a discontinuity indicator, step 150:

1) because a discontinuity indicator is not necessarily in the same data packet as a next Program Clock Reference (PCR) value, when the next PCR value is received, a counter within Clock Management circuitry (shown in FIG. 2A) contained within transport decoder 110 is loaded with the next PCR value, step 152;

3) subsequent packets, parsed and stored in memory, are searched for a time stamp and, when one is found, the time stamp value is retrieved, step 154;

4) a timer interrupt is set by the microprocessor 116 for a point in time that is just less than one frame time before the retrieved time stamp value, step 156; and 5) when this timer interrupt occurs, the current STC value is sent to the external video and audio decoders 118 and 120, step 158, thereby giving the external decoders sufficient time to process the data before the time stamp value in the datastream is compared to the counter value maintained in the video or audio decoders 118 or 120.

The implementation of these high level steps is described in detail below.

Figure 2A:
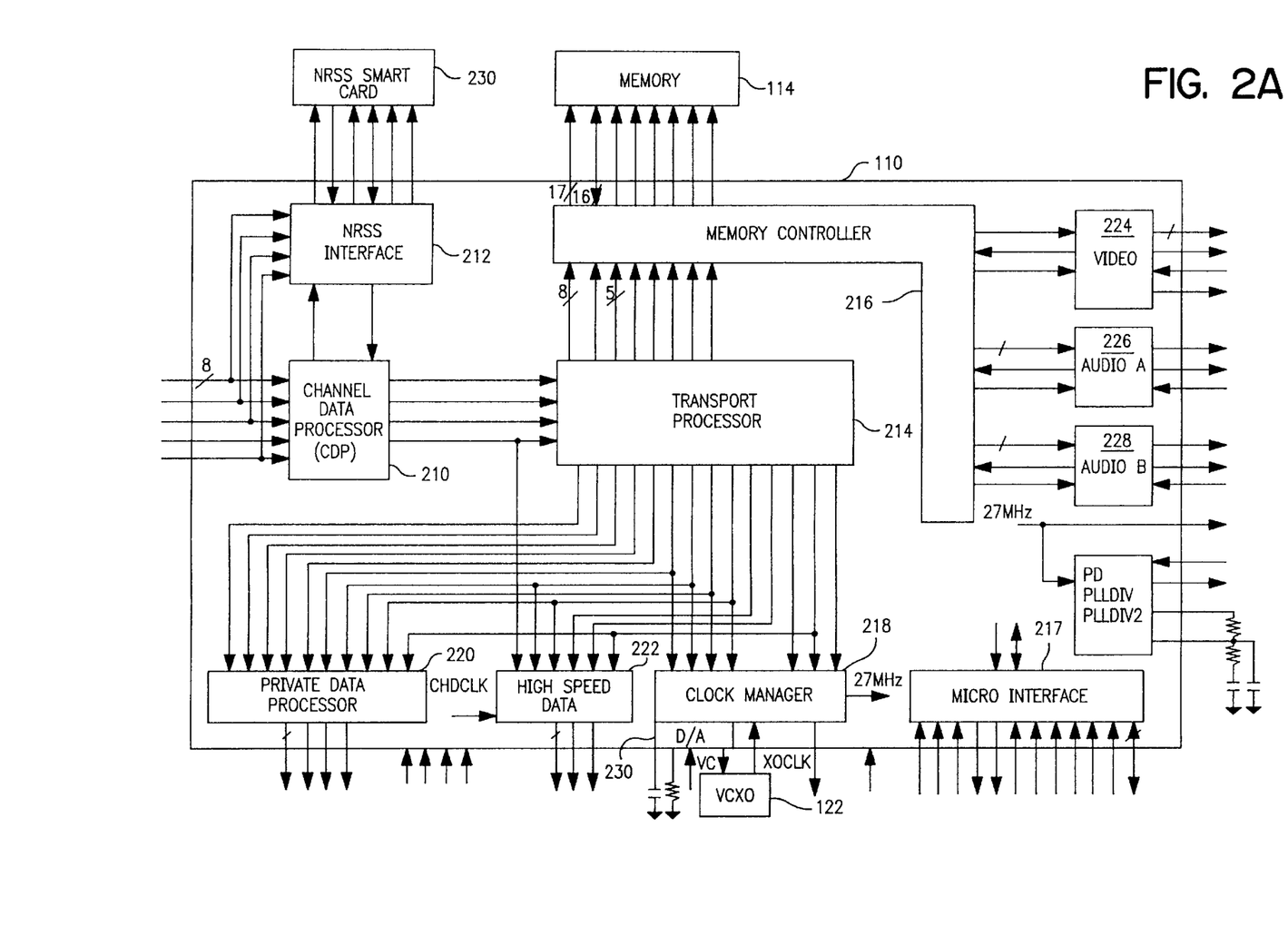
FIG. 2A shows a high-level functional block diagram of an exemplary implementation of a the transport decoder shown in FIG. 1A.
Figure 2B:
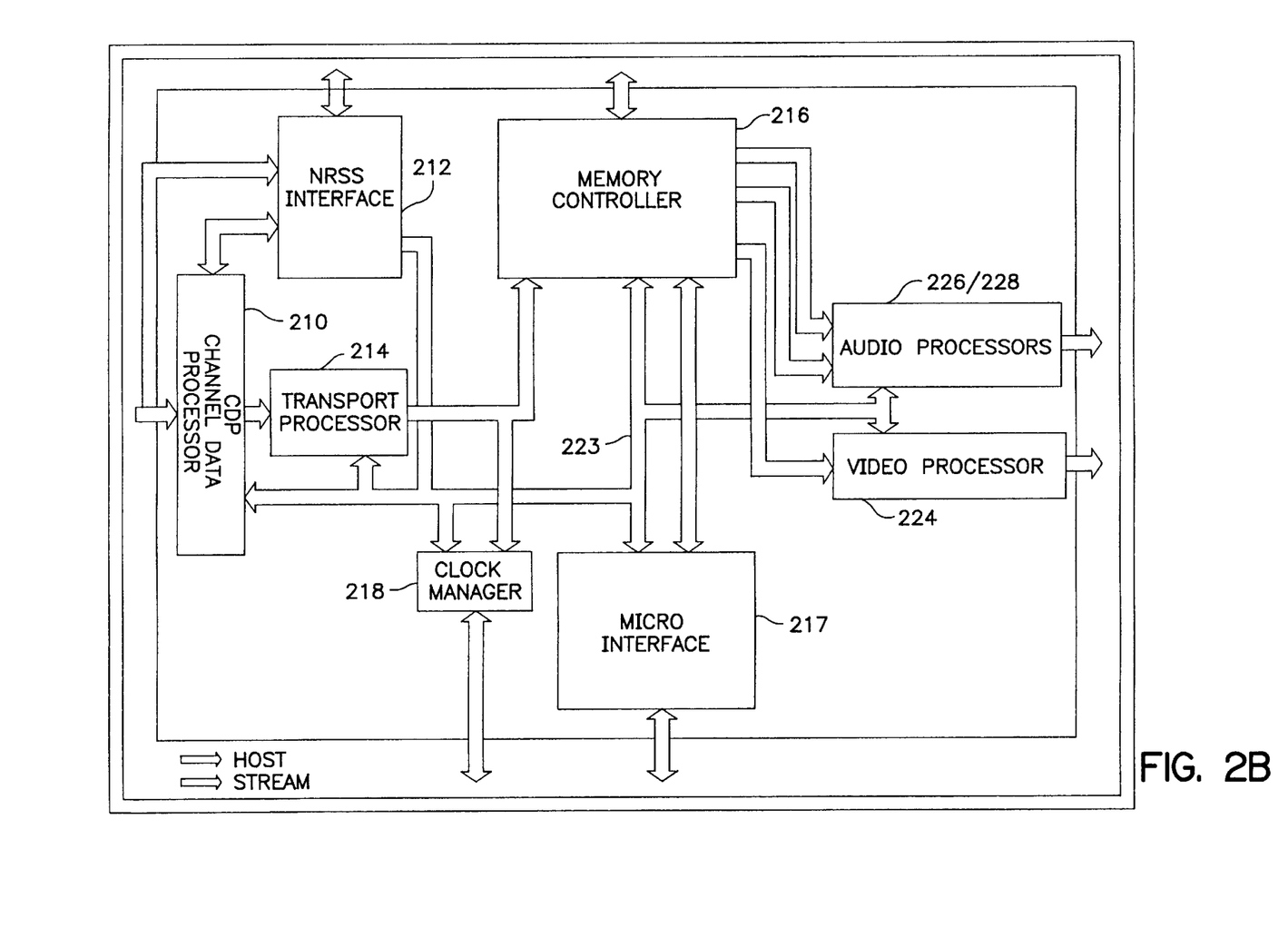
FIG. 2B shows a high-level data/control flow block diagram of an exemplary implementation of the transport decoder shown in FIG. 1A.

FIGS. 2A and 2B show high-level functional block diagrams of an exemplary implementation of the transport decoder 110 shown in FIG. 1A. With reference to FIGS. 2A and 2B, the overall data flow in the transport decoder 110 is described.

As shown in the figures, the channel interface 112 of FIG. 1A leads to a channel data processor (CDP) 210. Channel interface 112 also provides data to an NRSS interface 212 for purposes of decryption by the NRSS Smart Card 230. The EIA Standard for Conditional Access, Version 2.6, NRSS Committee (4/95) is hereby incorporated by reference for its teaching regarding the NRSS Smart Card.

The CDP 210 is provided to preprocess (e.g., detect, synchronize and validate) the packets in the received datastream. The CDP 210, after performing its processing, forwards its output data to transport processor (TPROC) 214 for further processing. TPROC 214 performs various processing, such as parsing, in accordance with a PID Table described below in detail.

The TPROC 214 interacts with several of the functional blocks within transport decoder 110 including a Memory Controller 216, a Clock Manager 218, a Private Data Processor 220, and a High Speed Data Port 222. As mentioned, the microprocessor 116 has direct access to various on-chip registers. This access is gained by way of a Micro Interface 217 and the internal microbus 223 (shown in FIG. 2B). Memory Controller 216, in addition to being coupled to TPROC 214, is also coupled to external memory 114 and video and audio decoders 224, 226 and 228.

The details of the processing of the digital datastream, with respect to the individual functional blocks, is now described.

Channel Data Processor (CDP) 210

It is noted that the datastream from the channel interface 112 is passed to the CDP 210, after possible buffering (not shown).

The CDP 210 performs various preprocessing steps on the received datastream. In particular, CDP 210 determines the byte and frame boundaries in the datastream and converts the received datastream into an 8-bit parallel format. In the exemplary embodiment of the present invention, operations occurring in the transport decoder 110 subsequent to the CDP 210 are performed using a byte format.

To determine byte and frame boundaries, the CDP 210 synchronizes to a framing pattern contained in the header of a Transport Packet. In particular, this synchronization is achieved by searching for the MPEG-2 Transport Stream sync_byte (e.g., 47 H) and verifying its occurrence at the start of a programmable number of consecutive transport packets.

In doing so, the CDP 210 checks for the sync_byte, "locks" on to the datastream and continues validating packets. When the sync_byte search is in progress, a Search_State bit is set in a CDP Status Register (not shown). When the sync_byte has been found and verification of successive occurrences is in progress, a Sync_State bit is set. Finally, a Lock_State bit is set when a predetermined search criterion is met. In the exemplary embodiment of the present invention, the search criterion is three consecutive validated packets. Also, a Sync_Hysterisis value, indicating the number of packets with corrupted sync_bytes that the CDP 210 is programmed to allow to pass through before declaring loss of Lock_State, is established. When this hysterisis value is exceeded, a loss of lock is declared. The CDP 210 then issues a Lock_Lost interrupt and transitions from the Lock_State back to the Search_State.

Additionally, if the channel interface 112 (shown in FIG. 1A) provides a CHPSTRT signal, the transport decoder 110 may be configured to use this signal as a means to synchronize to the datastream by setting a Framing_Mode bit in a CDP Framing and Sync Control Register to logical "1". In this case, synchronization is achieved within one transport packet time after the CHPSTRT is asserted.

Alternatively, if an Ignore_Sync bit, in the CDP Framing and Sync Control Register, is set to logical "0", the CDP 210 verifies sync_byte integrity at the expected (first) byte location relative to the CHPSTRT signal transition and declares a lock condition if verification fails. If Ignore_Sync is set to 1, the CDP 210 does not verify sync integrity.

After achieving the Lock_State, the output of the CDP 210 can be passed to and processed by the TPROC 214, which further processes (e.g., filters, parses, and formats) the data now in byte format.

Transport Processor (TPROC) 214

Signals produced by the TPROC 214 control the flow of data to the Memory Controller 216, the Micro Interface 217, the Clock Manager 218, the Private Data Processor 220 and the High Speed Data Port 222.

In the exemplary embodiment of the present invention, the TPROC 214 processes the data stream under control of a PID Table. As described in the Systems Section, a PID is a 13-bit field in a Transport Stream Header, indicating the type of data stored in the packet payload. Some PID values are assigned and some are reserved. Additional details of the PID Table are described in Section 3.3 of the Systems Section of the above-referenced MPEG-2 specification.

Regarding the PID Table, the TPROC 214 is capable of concurrently processing up to 32 user-selectable PIDs. The PIDs which the transport decoder 110 is to process are specified in the PID Table. Bit fields in the PID Table specify various processing options for the data.

In operation, the PID is extracted by the TPROC 214 from the header of an incoming transport packet and simultaneously compared to all of the entries in the PID Table. If a match is found, the data in the packet is processed according to the options set in the matching PID Table entry. If no PID Table s entry matches, the packet is discarded.

Each location in the PID Table for which the Payload Format bits are not set to Discard (000), is associated with a channel number. In conjunction with the TPROC 214, the Memory Controller 216 is responsible for transferring data to a specific buffer area (channel) in RAM. Operation of the Memory Controller 216 is discussed in detail below with reference to FIGS. 2, 3 and 4.

In the exemplary embodiment of the present invention, the PID Table, maintained in TRPROC 214, is set up under software control by the microprocessor 116 via the internal microbus 223 during an initialization process.

Regarding PID Table entry format, a PID Table entry includes, among other information, 1) a 13-bit PID and 2) a 1-bit PCR PID field which, when set, indicates that this PID carries the PCR for the program being decoded. An exemplary PID Table entry also includes a 1 bit PES HDR bit which, when set, enables the RAM buffer address corresponding to a "Stream ID" in the PES header to be stored to a Pointers FIFO. An interrupt is issued by the Memory Controller 216 when it writes data to the Pointers FIFO. This interrupt is referred to as a DMA_MARK signal which serves to alert the microprocessor 116 of the delivery of the Stream_ID byte. In the exemplary embodiment of the present invention, Channel Numbers are assigned to PID Table entries in numerical order based on their location in the table, for example, the first entry is assigned DMA Channel 0, the next one DMA Channel 1 and so on.

The TPROC 214 indicates that transport packets with PCR PID should be processed by the Clock Manager 218 by placing a PCR_PID signal in the PID Table entry. The Clock Manager 218 then monitors the adaptation fields of such packets for a PCR_flag and extracts the PCR.

After separating the packets according to their PIDs, the TPROC 214 removes the headers of the transport packets and, in conjunction with the Memory Controller 216, stores packet payloads (e.g., portions of PES packets) for the respective PID's in sequential memory locations of the designated channel in the external memory 114. The data in the memory 114 represents PES packets.

The TPROC 214 also handles write operations to the external memory from the host microprocessor 116.

Memory Controller 216

The Memory Controller 216 stores the parsed payload of Transport Packets in external memory 114 and provides video, audio, PSI and other data (e.g., private data) upon demand to the Video Processor 224, up to two Audio Processors 226 and 228 and to the host microprocessor 116 (or microcontroller).

Figure 3:
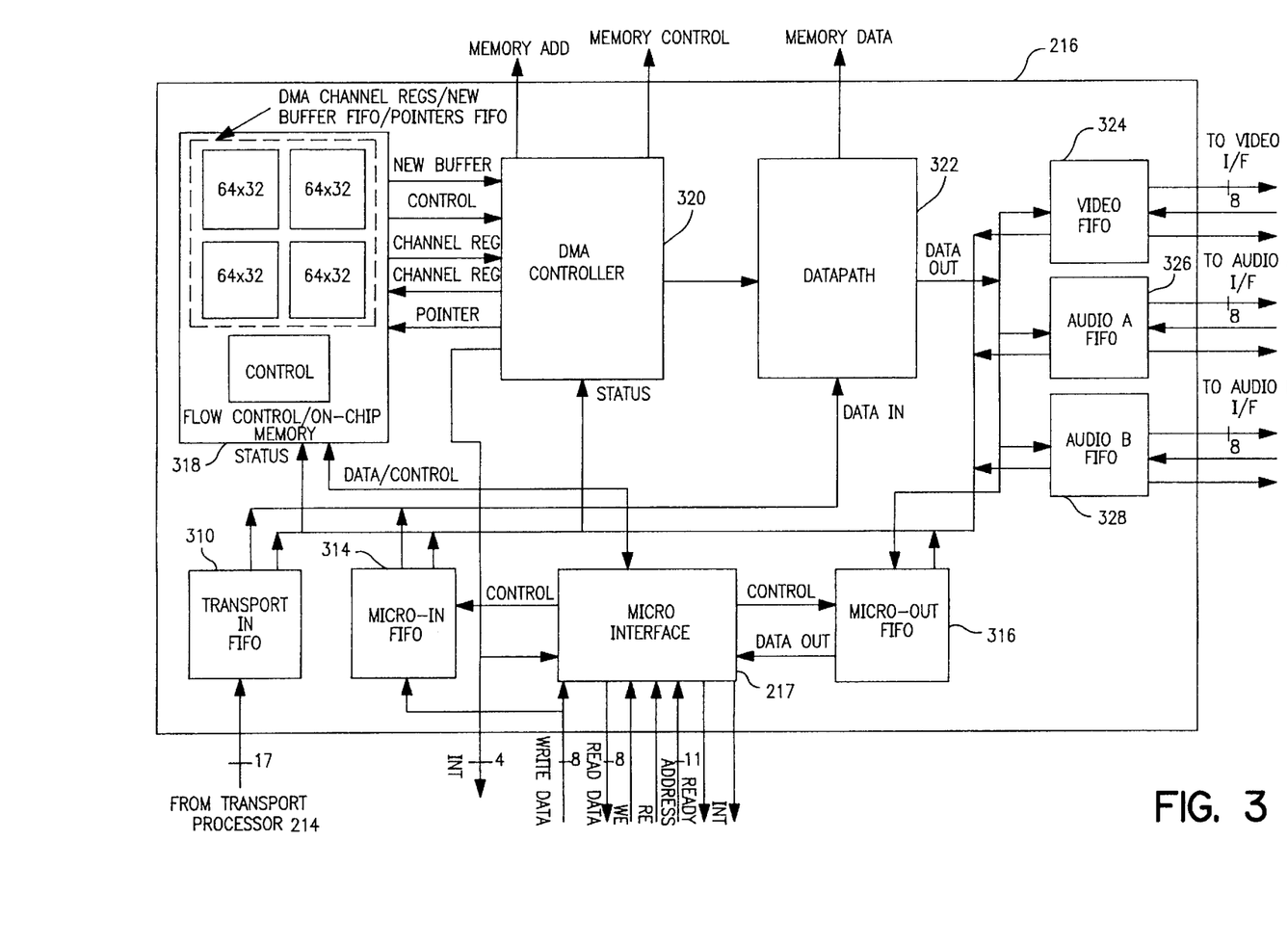
FIG. 3 shows a functional block diagram of the memory controller used in the transport decoder shown in FIG. 2.

FIG. 3 shows an exemplary functional block diagram of a Memory Controller suitable for use in the transport decoder 110 shown in FIGS. 2A and 2b. As shown in FIG. 3, the Memory Controller 216 receives data from the TPROC 214 via a Transport In FIFO 310. Memory Controller 216 receives/transmits data from the microprocessor 116 via Micro Interface 217 including Micro-in FIFO 314 and Micro-out FIFO 316. It is noted that the Micro Interface 217, shown external to Memory Controller 216 in FIGS. 2A and 2B, is shown in FIG. 3 for the sake of clearly illustrating its interrelationship with FIFOs 314 and 316.

The Memory Controller 216 also includes a Flow Control Unit 318 containing On Chip Memory, a DMA Controller 320, Datapath logic 322, and FIFOs 324, 326 and 328 for delivering data to the video and audio decoders 224, 226 and 228, respectively.

The Memory Controller 216 writes data into external memory from two sources: one is the TPROC 214 (through the Transport In FIFO 310) and the other is the microprocessor 116 (through the Micro In FIFO 314).

The Memory Controller 216 reads data from external memory and supplies it to the following four destinations 1) Video Interface (through the Video FIFO 324), 2) Audio A Interface (through the Audio A FIFO 326), 3) Audio B Interface (through the Audio B FIFO 328), and 4) microcontroller 116 (through the Micro Out FIFO 316).

The external memory space is divided into separate, non-overlapping buffer areas, one for each DMA Channel in use. Up to 32 channels can be used. A channel number is associated with data written into the two source FIFOs or read out of the four destination FIFOs.

Data provided by the TPROC 214 and written into the Transport In FIFO 310 carries a channel number tag. The channel number for each of the other FIFOs is defined by the microcontroller 116 in a DMA Interface Register. A 128-bit DMA Channel Configuration Register (Channel Register) is set up by the microprocessor 116 for each channel in use. The Channel Register contains configuration information such as the buffer space defined by Begin and End Addresses, whether the buffer is configured as a FIFO (read and write pointers wrap around, sometimes referred to as a circular queue) or as a Queue (read and write pointers do not wrap around), etc.

Figure 4:
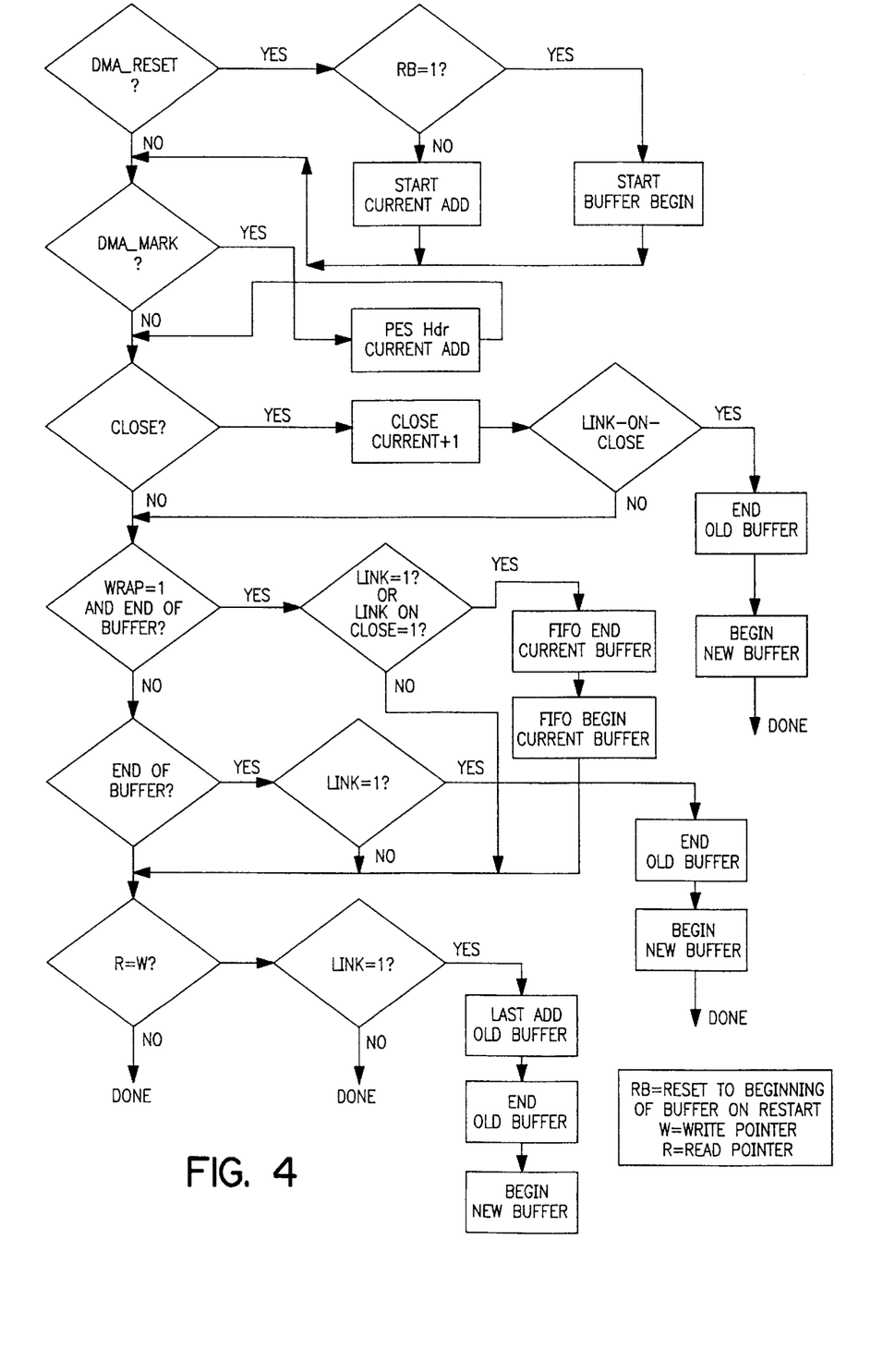
FIG. 4 shows an exemplary flowchart illustrating how the memory controller handles Pointers FIFO Entries.

If the Channel Register allows, the DMA Controller 320 can obtain a new buffer when the one it is currently using becomes full. This feature is normally used only for buffers which store data that is destined for the host microprocessor 116, such as PSI sections. The Begin and End Addresses of these new buffers are stored in a New Buffer FIFO. Only the microprocessor 116 can write new buffers to this FIFO. Used buffer pointers and other types of pointers are written by the DMA Controller 320 to the Pointers FIFO. In the exemplary embodiment of the present invention, only the microprocessor 116 can read the Pointers FIFO. These pointers are used by the microprocessor 116 to manage reading of buffer data and to return used buffers back to the New Buffer FIFO. The Pointers FIFO Entries Flowchart, shown in FIG. 4, shows the entries to the Pointers FIFO for all possible signal conditions, Channel Register configurations and buffer conditions.

Continuing with FIG. 3, the DMA Controller 320 and Datapath logic 322 provide all interface signals to the external memory. The Flow Control Unit 318 directs the DMA Controller 320 to service a specific interface FIFO (one of six) by providing the appropriate control signals to it. These include:

1. DMA Controller Start

This signal commands the DMA Controller 320 to start servicing a specific FIFO using the commands such as DMA Controller Operation, DMA Input FIFO Select and DMA Output FIFO Select. At the same time, Flow Control Unit 318 reads out the 128-bit Channel Register and makes it available on the data bus of the Channel Register (internal memory). The DMA Controller 320 reads this 128-bit word into its internal register and the Flow Control Unit 318 is then free to do other read/write operations as required on the internal memory.

2. DMA Controller Operation (1 bit)

This bit signals a Write or Read operation to be performed by the DMA Controller on the interface FIFOs.

3. DMA Input FIFO Select (1 bit)

Signals which of the two input FIFOs 310 or 314 to service.

4. DMA Output FIFO Select (2 bits)

Signals which of the four output FIFOs 316m 324, 326 or 328 to service.

5. Channel Data In Request/Channel Data/Channel Number/DMA Controller Stop:

Usually, the DMA Controller 320 continues to service a FIFO until it cannot service the FIFO any longer due to some condition such as a full interface FIFO, or no data in external memory, etc. When this type of condition occurs, the DMA Controller 320 asserts the Channel Data In Request to the Flow Control Unit 318 and provides the Channel Register data and Channel Number data to the Flow Control Unit 318. The Flow Control Unit 318 updates the Channel Register memory with the Channel Data (updated information includes, for example, the Write and Read Pointers) and directs the DMA Controller 320 to service the next FIFO in the loop, unless a specific FIFO needs emergency action (because, for example, it may be approaching a full or empty status).

Occasionally, the Flow Control Unit 318 may need to issue a DMA Controller Stop command to the DMA Controller 320 in response to a need to service another FIFO such as the Transport In FIFO which may have a higher priority. This command directs the DMA Controller 320 to stop servicing the FIFO it is currently servicing and write the Channel data to the Flow Control Unit 318.

The Channel Register is updated by the DMA Controller 320 with a Read Pointer, a Write Pointer and other information at the point at which it stops servicing a FIFO. Since the Flow Control Unit 318 writes this to the internal Channel Register memory, the DMA Controller 320 can resume service to the interrupted FIFO from the point at which it was interrupted.

With reference to the DMA Controller's participation in the overall operation of the discontinuity state aspect of the present invention, when a next PES packet containing a Stream ID byte is written to the Memory Controller 216 by TPROC 214, the Flow Control Unit 318 causes the DMA_MARK signal to go high. The transition of the DMA_MARK signal triggers an interrupt at microprocessor 116 and the address of the PES packet header is stored in an input pointer FIFO to which the microprocessor has access. Since this PES header may have a time-stamp, the microprocessor 116, responsive to the flag raised by the discontinuity indicator, searches the stored PES headers for a time stamp and, when it finds one, retrieves the time stamp value. Based on the retrieved timestamp value, microprocessor 116 sets a timer interrupt.

Referring back to FIG. 3, in the exemplary embodiment of the present invention, internal memory of the Flow Control Unit 318 includes four blocks of 64×32 bits, each of which are assigned for Channel Registers, New Buffer FIFO and Pointers FIFO.

In the exemplary embodiment of the invention, each Channel Register has 128 bits and there may be a maximum of 32 channels, so up to 128×32 bits can be assigned to Channel Registers, in multiples of 128 bits.

Words of 32-bits are written to and read from the New Buffer and Pointers FIFOs. At least 128×32 bits of memory (i.e., 128 words) are available for the New Buffer and Pointer FIFOs. Additionally, if less than 32 channels are in use, unused capacity from the Channel Register memory can be allocated to the New Buffer and Pointer FIFOs.

Following are examples of memory allocation for 32 DMA channels and 16 DMA channels.

1) Memory allocation for 32 used channels

New Buffer FIFO=64×32 bits

Pointer FIFO=64×32 bits

Channel Registers=128×32 bits

2) Memory allocation for 16 used channels

New Buffer FIFO=64×32 bits.

Pointer FIFO=128×32 bits

Channel Registers=128×16 bits

Clock Manager 218

The Clock Manager 218, shown in FIGS. 2A and 2B, of the transport decoder 110 synchronizes a local 27 MHz signal (generated by clock signal circuitry 122) using successive PCR values. The value of the counter in the Clock Manager 218 is referred to as the System Time Constant (STC) value. The microprocessor 116, in the exemplary embodiment of the present invention, has access to the STC value in the counter via the internal microbus 223.

The counter in the Clock Manager 218 is periodically synchronized to the PCRs carried in the transport data stream. When the first PCR in a data stream is encountered, the PCR is "jam loaded" in the counter to become the initial STC value. As subsequent PCR values are received, they are compared to the STC value to adjust the frequency of the clock signal circuitry 122 (e.g., VCXO). In the present invention, this is accomplished using a Digital-to-Analog converter (DAC) described in detail below. Once phase error adjustments are made, generally, the new PCR value is loaded as the STC value.

Normally PCR values occur once per frame. Under the MPEG-2 standard, they must occur at least in every third frame (one-tenth of a second).

The external video and audio decoders 118 and 120 are typically synchronized to the transport decoder 110 by updating the STC value in the external decoders based on the STC value maintained in the Clock Manager 218. The video and audio decoders 118 and 120 use the stored value to determine when data is to be decoded/displayed by comparing it to timestamps in the received PES datastream. It is noted that, in the exemplary embodiment of the present invention, the transport decoder 110, video decoder 118 and audio decoder 120 all receive the same 27 MHz clock signal generated by the Clock Manager 218.

The transport decoder 110 contains hardware support for locally generating a clock signal that is locked to the system clock signal for a selected program. As mentioned above, PCR values received on the specified PCR_PID are made available on a serial interface for use by other devices.

The Clock Manager 218 includes a System Time Counter (STC) (not shown), a System Time Clock Register (not shown), a Program Clock Reference Register(not shown), a Current STC Register (not shown), an Alarm Clock Interrupt Register (not shown) and logic (not shown) to latch PCRs extracted from the headers that are associated with a selected PID. It also contains the serial PCR interface, and a DAC Register for control of an external system clock signal control loop.

In the exemplary embodiment of the present invention, the STC is a 42-bit counter having a 9-bit base and 33-bit extension.

The STC base divides the nominal 27 MHz System Clock input signal by 300. The resulting 90 KHz signal drives the STC extension. The STC can be read or written by software executing on the microprocessor 116 at any time. Optionally, the STC can be automatically loaded with a received PCR after a discontinuity indicator has been encountered.

As mentioned above, PCRs may be automatically extracted from the incoming bit stream by setting the PCR_PID bit in a PID Table entry. Handling of the received PCRs depends upon options set by software and whether a discontinuity state exists for the current transport packet when the PCR is received.

A discontinuity state is recognized when a transport packet which contains the PCR_PID is received with a logic 1 in the discontinuity_indicator bit in the Transport header. The discontinuity state exists until either a transport packet containing the PCR_PID is received with a logic 0 in the discontinuity_indicator, or until the next PCR is found in a PCR_PID packet.

If enabled, the Clock Manager 218 automatically loads the received PCR into the STC when a PCR is received while a discontinuity state exists. At this instant, an interrupt is issued to the host microprocessor 116.

The Clock Manager 218 contains an Initialize bit which, when set to logic 1 by software, causes the next PCR received to be loaded into the STC regardless of whether a discontinuity state exists or not. The Initialize bit is subsequently cleared automatically by the Clock Manager 218. The Initialize bit is set only when the STC does not contain a valid PCR (i.e., when a new PID has been selected.)

If no discontinuity state exists or if the automatic STC loading function is disabled, a received PCR is stored in the PCR register and (optionally) an interrupt is issued to the host microprocessor 116. At the same time that the PCR is captured, the current state of the STC is stored in the STC Register. The stored PCR and STC values are used to compute an error signal to control the external system clock signal (XOCLK).

When a Transport Packet is received which has a PID equal to the PCR_PID and which contains a PCR, the PCR is latched in the PCR Register. The current contents of the STC Counter are also latched in the STC Register at that time, and an interrupt is issued to the host microprocessor 116. Latching both values eliminates any uncertainty due to varying latency in the interrupt service routine. In the exemplary embodiment of the present invention, both registers consist of a 9 bit base and 33-bit extension. The base part is modulo 300, whereas the extension is binary. Before the register contents can be used in any calculations, they are converted to a single binary count by multiplying the extension by 300 and adding the base part to the result.

The Current STC Register is a read-only register which allows the microcontroller 116 to obtain the current contents of the STC at any time. The microcontroller 116 can initialize the STC of the Video Decoder or Audio Decoder with this value by way of the external microbus 124.

As described above, transport decoder 110 contains a 10-bit digital-to-analog converter (DAC) 230 for use in the clock adjustment control loop within the Clock Manager 218. The DAC 230 is write-only, i.e., software keeps a copy of the last value loaded into the DAC in memory. In operation, the DAC 230 is used to generate the control voltage for the external resonant crystal voltage controlled oscillator, VCXO 122, which is source of the system clock frequency (27 MHz nominal). By comparing the latched PCR and STC values, software can determine whether the local clock signal requires adjustment. For example, software may take the difference between the PCR and STC and add this error term to the current contents of the input register of DAC 230.

To review, the discontinuity aspect of the present invention includes:

1) The Channel Data Processor (CDP) 210 checks the synchronization byte in received transport packets to validate the packets. The Transport Processor (TPROC) 214 parses the transport header and passes the packet payloads to the proper location in the memory. Data is directed to different FIFO buffers (channels) in the memory based on the PID values in the transport headers.

2) Because a received discontinuity indicator is not necessarily in the same packet as the next PCR value, when the next PCR value is received, the TPROC 214 "jam loads" the counter in the Clock Manager 218.

3) When the next PES packet containing a Stream ID byte is written to the Memory Controller 216 by TPROC 214, the DMA_MARK signal goes high. This causes the Memory Controller 216 to interrupt the microprocessor 116 and store the address of the PES packet header in an input pointer FIFO. This PES header may have a time-stamp (either decode timestamp or presentation timestamp). The microprocessor 116, responsive to the interrupt from the Memory Controller 216, searches the PES headers for a time stamp and, when it finds one, retrieves the time stamp value.

4) The microprocessor 116 then sets a timer interrupt for a time that is just less than one frame time before the timestamp value.

5) When this timer interrupt occurs, the microprocessor 116 sends the new PCR value to the video and audio decoders by way of the external microbus 124. This gives the decoders sufficient time to process the data before its time-stamp is compared to the counter value in the video or audio decoder, without interfering with the processing of data that is reverenced to the prior PCR value.

Video/Audio Decoders 224, 226, 228

Once the transport packets are received, processed and stored, as mentioned above, Memory Controller 216 reads the PES packets out of memory 114 and forwards them to the external video and audio decoders. Before the PES packets reach the external decoders 118 and 120, however, they are processed by internal video and audio processors 224, 226 and 228.

An important role of these internal processors is to ensure that the stream of data leaving the transport decoder is compatible with the external decoders. That is, different external decoders have different data requirements.

For example, some currently available external video decoders can accept a stream of PES packets, including header and payload, essentially in the same form in which it is read out of memory. On the other hand, some external decoders can only accept for processing an elementary stream (i.e., PES packet payloads but no headers). Additionally, the latter type of decoder may require, in addition to the datastream, associated control information such as timestamps and byte counts. One such video decoder is the CL9100 made by C-Cube, the specification of which—CL9100 Multimode Video Decoder User's Manual (10/94)—is hereby incorporated by reference. Accordingly, video processor 224 is configurable, by way of microprocessor 116, to format the outgoing datastream to be compatible with the requirements of the selected external decoder.

With respect to handling the interface to an external video decoder such as a C-Cube CL9100, video processor 224 processes the stream of PES packets in order to strip off the PES header and extract, from the PES header, timestamp information. In addition, video processor 224 maintains a byte count, using a counter (not shown), for the PES packets forwarded to the external decoder. Thus, video processor 224 holds timestamp information, maintains a byte count and forwards the PES packet payloads on to the external video decoder. In order to get the timestamp and byte count information to the external decoder, video processor 224 sends an interrupt to microprocessor 116 which, when it responds, reads the timestamp and byte count information from the video processor 224 via the internal microbus 223 and delivers this control information to the external video decoder via the external microbus 124.

Sometimes, however, before microprocessor 116 is able to respond to the interrupt from video processor 224, another PES header with timestamp information arrives. This may occur, for example, if the microprocessor 116 was involved with a higher priority task for an extended period of time. In this case, video processor 224 stores the timestamp information along with a status. In particular, video processor 224 maintains a status register indicating whether microprocessor has "missed" any timestamps. When, in the exemplary embodiment of the invention, microprocessor 116 finally begins to read the timestamp information, if it has missed one or more timestamps as indicated in by the status, it only retrieves the most recent timestamp.

Additionally, since timestamp information and byte count information are to be provided to the external decoder, when the microprocessor 116 misses a timestamp, video processor 224 maintains a cumulative byte count for however many timestamps may arrive before microprocessor 116 reads the information. Thus, microprocessor 116 reads the most recent timestamp and cumulative byte count and delivers this information to the external video decoder. Subsequently, the status register and byte count may be reset.

Figure 5A:
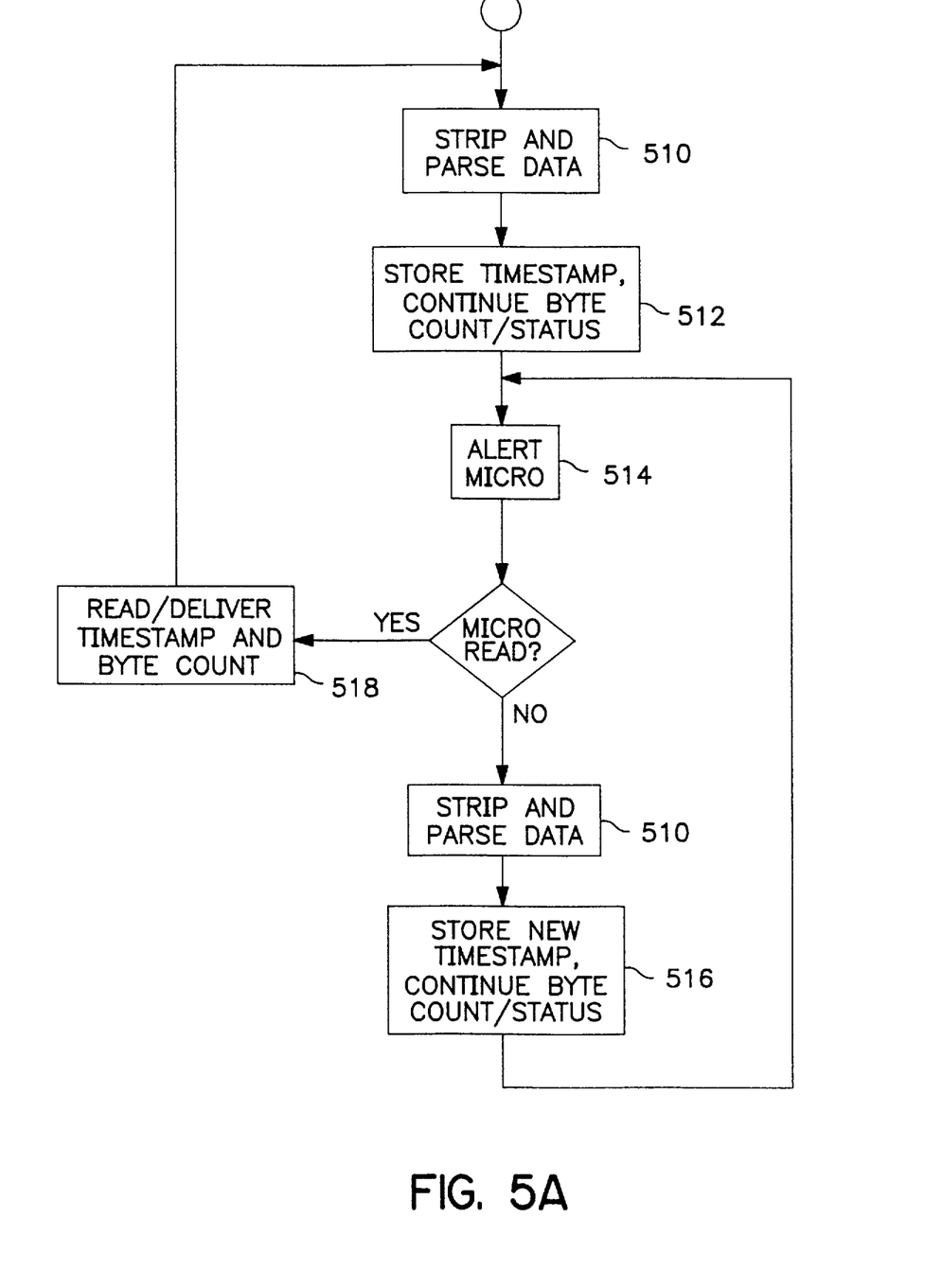
FIG. 5A shows an exemplary flowchart illustrating steps executed during the video decoder interface aspect of the present invention.

As shown in the flowchart of FIG. 5A, the headers of received data are stripped and parsed (step 510), timestamp information is stored and a byte count is maintained (step 512), an interrupt is issued by video processor 224 to microprocessor 116 alerting it that timestamp information is available for reading (step 514), if additional timestamp information is received before microprocessor reads the previous timestamp information, the new timestamp information is stored, the byte count continues to accumulate (step 516) and the video processor 224 issues another interrupt to the microprocessor 116, otherwise microprocessor reads the status register, the timestamp information and the byte count information and delivers it to the external video decoder (step 518).

Another example of accommodating particular external decoders involves the use of bit rate-constrained audio decoders such as the Zoran ZR38500 AC3 audio decoder, the Specification (10/94) for which is hereby incorporated by reference. Generally, most audio decoders present a data request indicating they can accept audio data and then the transport decoder 110, via the audio processors 226/228, supplies audio data until the external audio processor negates the requests. In other words, there exists a handshake mechanism.

Bit-rate constrained decoders, however, such as the Zoran AC3 audio decoder, require that audio AC3 data be delivered as audio data frames, each frame including a frame time and bit-rate in its header. Delivering data in excess of this predetermined bit rate can cause the internal buffers to overflow and, consequently, cause a loss of data. Furthermore, these bit-rate constrained decoders do not provide a Data-Ready signal to indicate that they are ready to accept additional audio data.

Thus, as with the video decoder 224, the audio processors 226 and 228, are configurable to accommodate the selected external audio decoder. It is noted that, in the exemplary embodiment of the present invention, audio processors 226 and 228, except for addresses which allow access by microprocessor 116, are essentially identical.

Accordingly, audio processors 226/228, when programmed to interface with this type of audio decoder, assumes that the decoder is always issuing a data request signal. However, as PES packet audio data is supplied to audio processors 226/228 from Memory Controller 216, the PES header of the received data is parsed by the audio processors. Contained in the parsed header is a frame size and bit rate for the audio data. From the frame size and bit rate, the audio processors 226/228 can determine the frame boundary (i.e., frame time). Having frame time information, audio processors 226/228 set a frame timer such that, when audio data is available, the timer is set, a frame of data is "burst" out to the external audio decoder then the audio processors 226/228 and then pause until the frame timer expires. When the timer expires, the cycle continues, one audio frame at a time, while additional frames are available for sending to the external audio decoder. Control information, such as timestamps, are retrieved by the microprocessor and delivered via the external microbus.

Figure 5B:
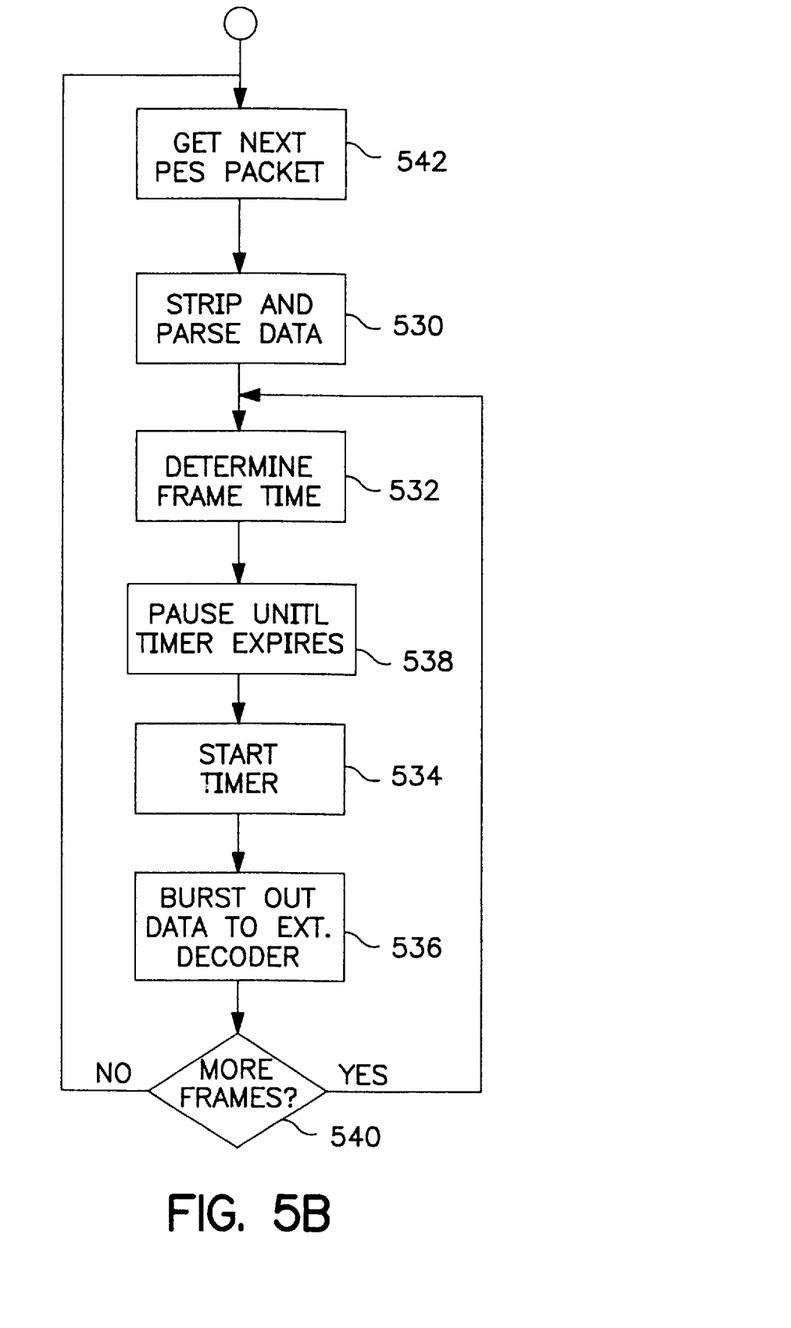
FIG. 5B shows an exemplary flowchart illustrating steps executed during the audio decoder interface aspect of the present invention.

As shown in the flowchart of FIG. 5B, PES packets are retrieved from memory (step 542), the headers of received data are stripped and parsed (step 530), a frame time is determined (step 532), the timer begins running (step 534), audio processors 226/228 burst out a frame of data (step 536) and audio processors 226/228 pause until the timer expires (step 538), although, as shown, steps 542, 530 and 532 can be carried out during the pause. Then, the process can continue.

Although the invention is illustrated and described herein as embodied in a method and apparatus for updating the system time constant following a discontinuity in an MPEG-2 transport data stream, the invention is not intended to be limited to the details shown. Rather, various modifications may be made in the details within the scope and range of equivalents of the claims and without departing from the spirit of the invention.

The invention claimed is:

1. A method for use in a transport decoder system designed for decoding a transport data stream which includes transport packets having headers and payloads, the headers including a discontinuity indicator, said system including at least one buffer for temporarily storing the received transport data stream and at least one decoder for decoding data output from the buffer for presentation purposes, each of said transport decoder and said decoder having separate counters, the method being a method for handling the receipt of a program counter reference (PCR) after a discontinuity state has been set comprising the steps of:

parsing received transport packets and storing the data in memory;

upon receiving a next PCR value, loading the transport decoder counter with the received program counter reference value;

searching the data stored in memory which is received after the PCR value for a time stamp and retrieving the time stamp;

setting a timer interrupt based on the retrieved time stamp value; and when the timer interrupt occurs, sending the PCR value to the counter of the decoder, thereby providing sufficient time for the decoder to process data.

2. The method of claim 1, wherein the timer interrupt is set for just less than one frame time before the time stamp value.

3. The method of claim 1, wherein the step of searching includes upon receipt of a transport packet which may contain a time stamp value, interrupting a host microcontroller to send the host microcontroller address information relating to the stored transport packet;

subsequently, searching at the appropriate address location of the stored transport packet for a time stamp value.

4. The method of claim 1, further comprising the step of:

before parsing, validating received transport packets by determining whether their boundaries correspond to predetermined packet boundaries and parsing only those packets which have been validated.

5. The method of claim 4, wherein the step of validating the received transport packet includes checking a synchronization byte in the received transport packet.

6. In a system designed for receiving a transport data stream which includes transport packets having headers and payloads, the headers including a discontinuity indicator, said system including at least one buffer for temporarily storing the received transport data stream and at least one decoder for decoding data output from the buffer for presentation purposes, each of said transport decoder and one decoder having separate counters, an apparatus for handling the receipt of a discontinuity indicator comprising:

means for receiving and detecting a discontinuity indicator;

means for parsing the transport packets and storing the data in memory;

means, upon receiving a next program counter reference value, for loading the transport decoder counter with the received program counter reference value;

means for searching the data stored in memory for a time stamp and, when one is found, for retrieving the time stamp;

means for setting a timer interrupt based on the time stamp value; and means, when the timer interrupt occurs, for sending the program counter reference value to the counter of the one decoder.

7. In a transport decoder system designed for decoding a transport datastream which includes transport packets having headers and payloads, the headers including a discontinuity indicator, said transport decoder coupled to at least one external decoder for decoding data output from the transport decoder, each of said transport decoder and said external decoders having separate counters for maintaining synchronization to the datastream, a method for handling the receipt of a discontinuity indicator comprising the steps of:

receiving the discontinuity indicator;

parsing the transport packet and storing the data in memory;

upon receiving a next program counter reference value, loading the transport decoder counter with the received program counter reference value;

searching the data stored in memory for a timestamp and, when one is found, retrieving the timestamp;

setting a timer interrupt for a point in time approximately one frame time before the time stamp value; and when the timer interrupt occurs, sending the program counter reference value to the counter of the decoder, thereby providing sufficient time for the decoder to process data.

* * * * *